United States Patent [19]

Levati et al.

[11] Patent Number: 4,755,804
[45] Date of Patent: Jul. 5, 1988

[54] SYSTEM FOR FEEDING AND CONTROLLING LOW INTENSITY OBSTRUCTION LIGHTS

[75] Inventors: Aldo Levati; Pietro Siviero, both of Milan, Italy

[73] Assignee: Telettra Telefonia Elettronica e Radio S.p.A., Italy

[21] Appl. No.: 855,591

[22] Filed: Apr. 23, 1986

[51] Int. Cl.$^4$ ............................................. G08B 21/00
[52] U.S. Cl. .................... 340/642; 340/638; 340/654; 340/663; 315/86; 315/154; 307/117; 307/64; 136/293; 362/1; 362/20
[58] Field of Search ............... 340/642, 636, 638, 639, 340/644, 645, 654, 663; 307/117, 125, 126, 140, 64, 65; 362/183, 145, 1, 20, 90, 254; 315/86, 149, 154, 311; 136/290, 293

[56] References Cited

U.S. PATENT DOCUMENTS

| | | | |
|---|---|---|---|
| 3,529,292 | 9/1970 | Neill et al. | 340/638 |
| 4,236,084 | 11/1980 | Gingras | 307/117 |
| 4,314,198 | 2/1982 | Rogers | 315/311 |
| 4,384,317 | 5/1983 | Stackpole | 362/183 |
| 4,484,104 | 11/1984 | O'Brien | 315/86 |
| 4,518,963 | 5/1985 | Rogers, Jr. | 340/642 |
| 4,539,625 | 9/1985 | Bornstein et al. | 362/145 |
| 4,611,201 | 9/1986 | Guim et al. | 340/638 |

OTHER PUBLICATIONS

"Energy Saver for Industrial Lighting" by Jim Arline et al., NASA Tech. Briefs, Fall 1979, vol. 4, No. 3.

"Fail-Safe Light Bulb" by Gaston, IBM Tech. Discl. Bulletin; vol. 12, No. 1, Jun. 1969.

*Primary Examiner*—John W. Caldwell, Sr.
*Assistant Examiner*—Tyrone Queen
*Attorney, Agent, or Firm*—Ostrolenk, Faber, Gerb & Soffen

[57] ABSTRACT

A system for feeding and controlling low intensity obstruction lights, involving low power drain especially in radio stations powered by solar cells includes:

a sub-system which not only generates the energy necessary to feed the obstruction light, but also detects solar intensity;

a control sub-system which delivers energy to the obstruction lights, triggered in correspondence to a light threshold, generates indicator signals on the operating state of the main on/off switch and the power circuit breaker and generates a lamp failure control for telemetering purposes and fault controls for the individual obstruction lights for local displaying purposes; and a low luminous intensity and low power drain lighting sub-system.

The installation to actuate the system described includes:

an electrical energy distributor powered by solar cells and respective batteries via a regulator, a light sensor, a sub-rack equipped with a control module and a switch-over module for each light;

2-filament lamps with lenticular light globe of the oriented Fresnel prisms type.

6 Claims, 4 Drawing Sheets

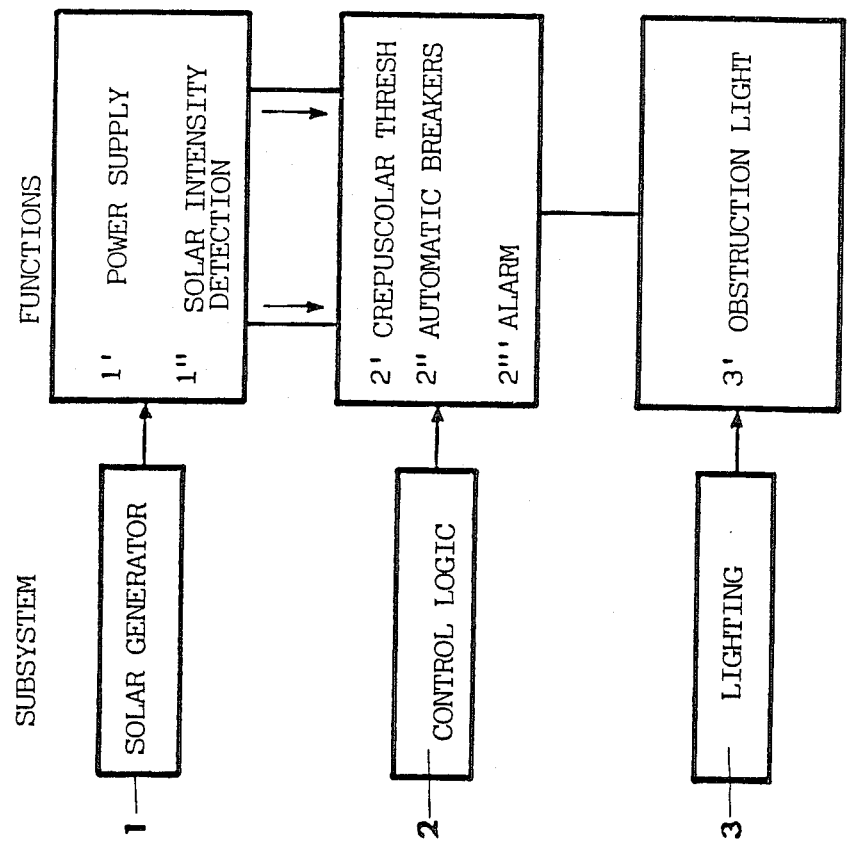

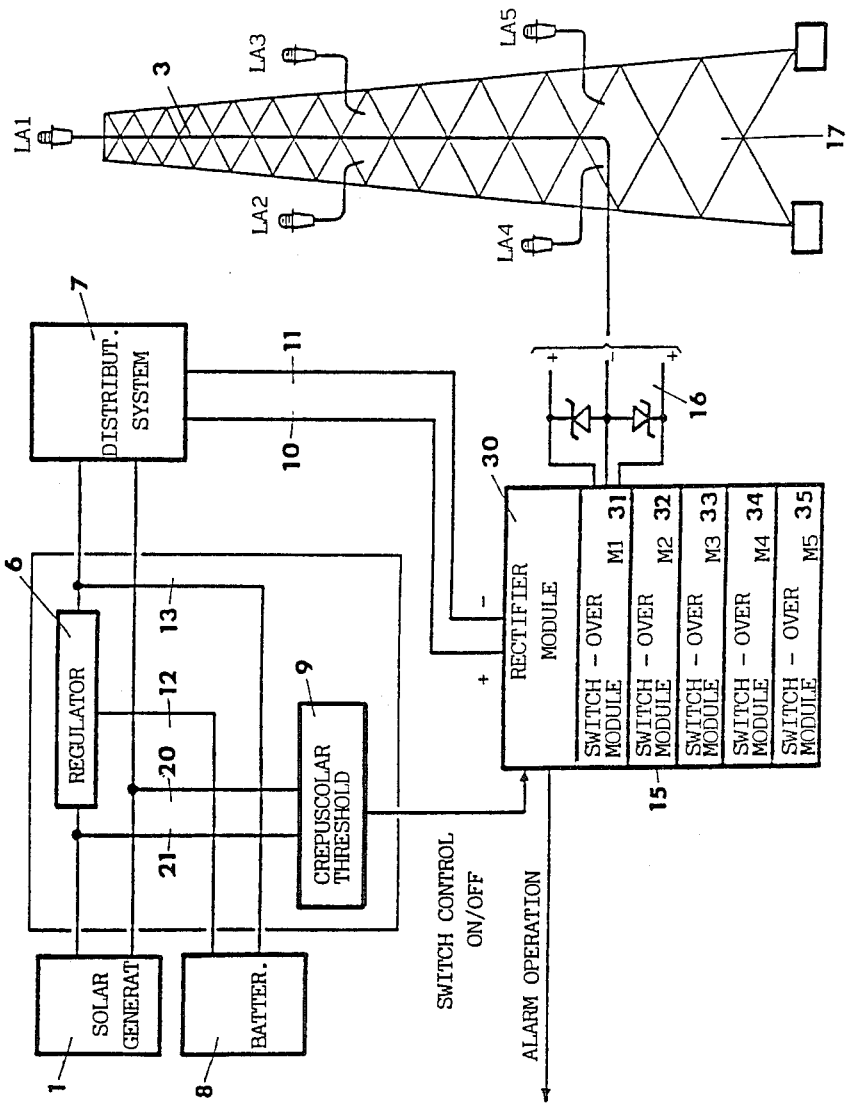
FIG. 2 – SYSTEM BLOCK DIAGRAM

FIG. 3 - GENERAL BLOCK DIAGRAM
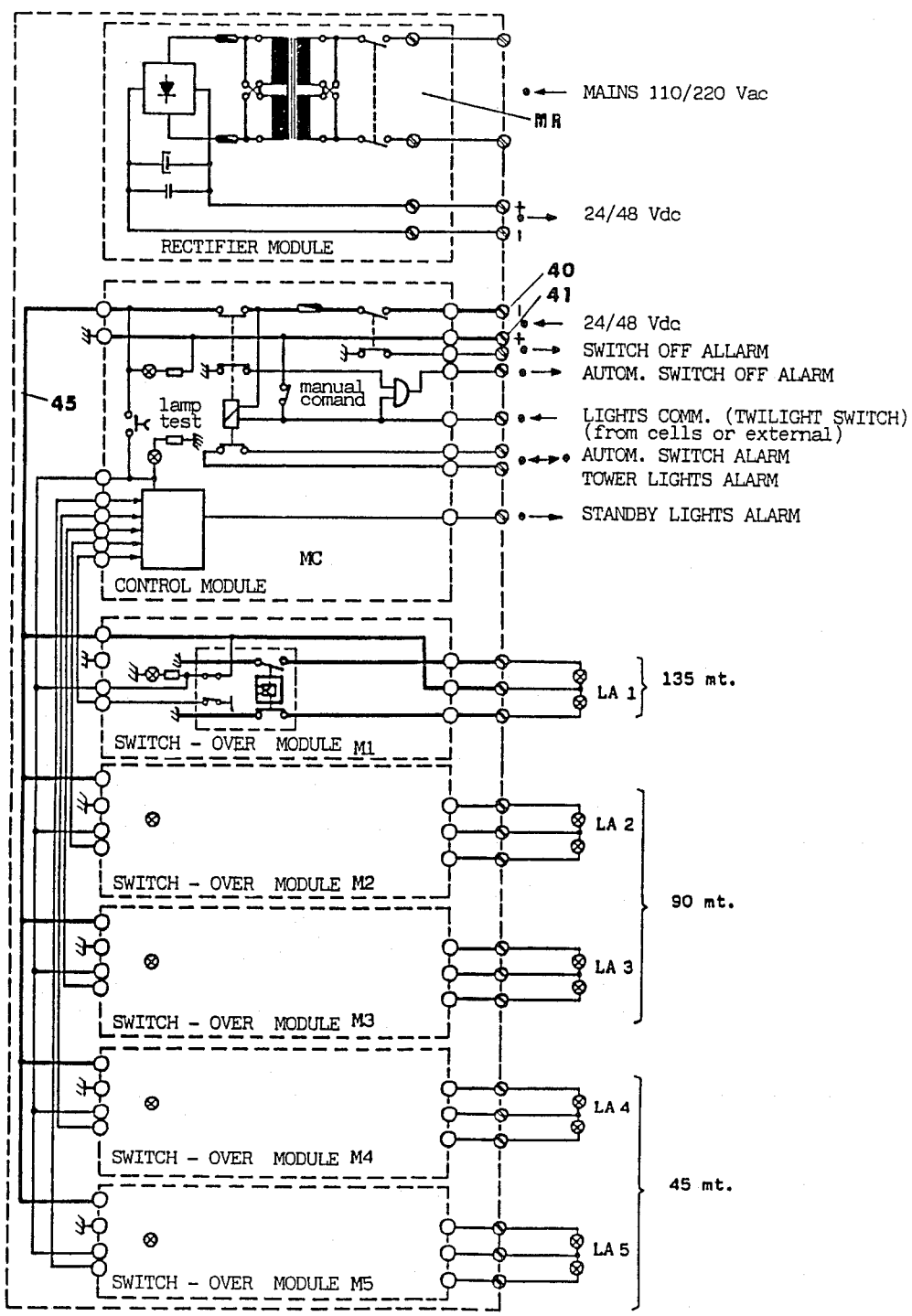

FIG. 4 - PHOTOMETRIC EMISSION DIAGRAM
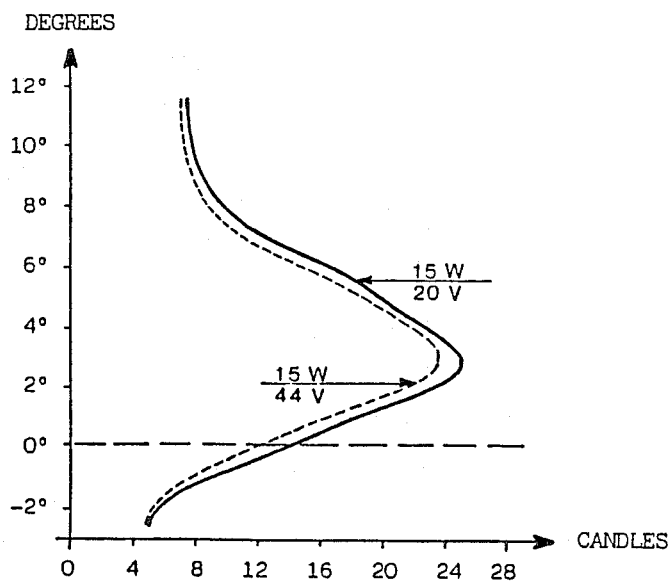
FIG. 5 - OBSTRUCTION LIGHT CONTROL SYSTEM LAY-OUT
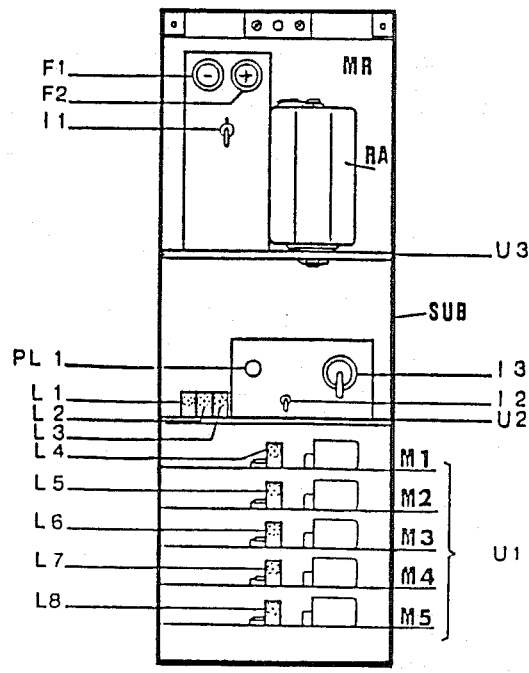

SYSTEM FOR FEEDING AND CONTROLLING LOW INTENSITY OBSTRUCTION LIGHTS

BACKGROUND OF THE INVENTION

The present invention covers an obstruction light control system, with special reference to those used in towers supporting electronic equipment, the system being inclusive of a power supply source and control, alarm and lighting means.

DESCRIPTION OF THE PRIOR ART

In the systems, with special reference to those used in towers supporting electronic equipment, the said system being inclusive of a power supply source and control, alarm and lighting means.

In prior obstruction light control systems, known in the art, power is generally used for 2-lamp light points. This is a rather power-consuming system in many cases, especially in those radio stations in which low power drain equipment is installed. Moreover, lamps are to some extent dangerous when they have to be replaced, and the systems incorporating them require control circuits and electromechanical switching-over devices.

This drawback and other ones seem to be paradoxical if one considers that, owing to the continuous progress in electronics, radio stations need today very low power drains, which can be complied with, for instance, by photovoltaic generators.

Conversely, the power drain values as required to feed the obstruction lights associated, for instance, to towers used to support repeaters, have remained substantially unchanged during the years, and consequently by far greater than the power drains of all the electronic equipment which, owing to more and more deep integration, will require less and less energy.

SUMMARY OF THE INVENTION

The object of the present invention is to provide an obstruction light feeding and control system which does not incorporate the drawbacks mentioned above and, which most importantly, is a low power drain system, can be powered from photovoltaic generators and incorporates effective and easy to maintain signalling lamps.

These objects and other ones are achieved using the system according to the invention which includes: an obstruction light feeding and control system, specially suited for radio stations powered from solar energy, characterized by the fact that it includes; a sub-system which, beside generating the energy necessary to power the circuits making up the invention, also detects solar intensity; a control sub-system which delivers energy to the lamps upon receiving a command from a light threshold device, generates indicator signals on the operating status of the main on/off switch and the power breaker and generates a lamp failure control for telemetering purposes (alarm OR) and individual lamp failure controls for local displaying purposes; and a lighting sub-system featuring low luminous intensity and low power drain.

The layout used to implement the system previously described includes: a system to actuate the previous system, characterized by the fact that it includes: an energy distributor powered from solar cells and the respective batteries by means of a regulator, a light sensor, a sub-rack equipped with a control module and a switch-over module for each light, 2-filament lamps, with lenticular light glove with Fresnel origented prisms.

BRIEF DESCRIPTION OF THE DRAWINGS

The different aspects of the invention will become apparent from the following description of the form of implementation (preferred and not restricted), shown in the attached drawings, in which:

FIG. 1 is a general block diagram;

FIG. 2 is a block diagram relevant to a convenient implementation of the general system shown in FIG. 1;

FIG. 3 is a circuit diagram;

FIG. 4 is a diagram of the lamps used;

FIG. 5 is an internal view of a sub-rack equipped with the modules in FIG. 3.

DETAILED DESCRIPTION OF THE PREFERRED EMBODIMENT

FIG. 1 shows that the obstruction light feeding and control system according to the invention includes three sub-systems: at least one solar generator (1) which performs a twofold function: (1') to provide the dc power and (1") to detect solar intensity; a control logic (2) which performs a threefold function: (2') light threshold; (2") on/off switch control and (2'''') alarm control; and (3) lighting devices whose function (3') is to signal the presence of the obstruction. A practical implementation of the block diagram in FIG. 1 is shown in FIG. 2. The generator (10 is made up of solar cells which power, via a regulator (6), either the batteries (8) (via connections 12-13) or the distribution system (7) which, via connections 10-11, feeds the obstruction line control equipment (15) which is connected, after a protection (16), to the signalling system (3) which, in this case, has been shown as a tower (17) equipped with several lamps, for instance five, LA1, LA2, LA3, LA4 and LA5.

According to an aspect of the invention, the cell voltage is also fed to a lightsensor (9) in which the voltage is compared with a reference threshold; whenever the voltage (or the corresponding detected signal) drops below the threshold, the light sensor (9) switches the power on and causes the lamp to turn on. The control equipment (15) includes a rectifier module 30 and a switch-over module 31-32-33-34-35 for the individual lamps LA1, LA2, LA3, LA4 and LA5. The rectifier module is included to allow operation should the primary power source be 110/220 Volt. ac; the 24/48 V dc power supply voltage is derived from a solar generator (1) with the respective batteries (8) of from the output of the rectifier module (FIG. 3).

The system according to the invention has been developed in full compliance with the applicable ICAO standards as a "low luminous intensity" and "low power drain" system, and its typical application is in radio stations powered from solar cells.

The system can be included as a module in the "integrated station" and is provided wtih appropriate lightning dischargers against induced voltage surges.

In the preferred implementation forms, the assembly basically includes two sections:

the automatic and control switch-on system, with up to, for instance, 5 lights, implemented with expandible modular PCSs;

the lighting system (obstruction signalling light) formed of an armoured cable and a signalling light made up of an incandescent bifilar lamp.

The control equipment makes up a "block" and its circuit diagram is shown in FIG. 3; this block performs the following functions:

(a) it receives dc energy (but, possibly, ac energy as well) in 40–41 and delivers it (line 45) in direction to one or more signalling lamps (for instance 5 lamps, LA1 through LA5), being controlled by the light switch (9) or an equivalent circuit thereof (voltage threshold in photovoltaic panel batteries);

(b) generates indicator signals on the status of the main on/off switch and the power breaker;

(c) generates a lamp failure control for telemetering purposes (alarm OR);

(d) generates the individual lamp failure controls for local displaying purposes.

The basic sub-rack (sub in FIG. 5), complete with wirring backplane and plug-in connectors, can be equipped with:

n. 1 control module MC;
n. 1 rectifier module for dc power supply, MR.

Control Module (Operating from −24 V dc and from −48 V dc)

The control module is used to control up to 5 light points.

It performs the following functions:

to actuate the lamp test control to check for the effectiveness of the front mounted signalling LEDs;

to receive the main light failure alarms from the individual modules and to implement an OR function of the said alarms for local signalling (LED) and telemetering (ground) purposes;

to receive the stand-by light failure alarms from the individual modules and to implement the OR function of the said alarms for local signalling (LED) and telemetering (ground) purposes;

to control switch on/off of the light points, via a front-mounted control or a remote control (ground);

to detect the on status of the lights mounted on the tower, for local signalling (LED) and telemetering (ground) facilities to indicate its opening (if any).

Switch-Over Module (Operating from −24 V dc and from −48 V dc)

The switch-over unit is used to control the switching-on of the stand-by filament light in the tower, should the main light fail. A peculiar characteristic of this unit is that it uses solid state components in both the control and alarm circuits and in the circuits used to operate power switch-over.

Another main characteristic is that it includes protection circuits against input lightnings from the tower light cable runs.

Rectifier Module

This unit is used to convert an ac (100 V ac or 220 V ac) power supply voltage into a rectified and smoothed voltage, so as to possibly use it instead of a battery voltage.

The use of the power supply unit includes an ac on/-off switch and two protection fuses, one for each phase.

Signalling Light

The signalling light consists of a 2-filament lamp (one filament is used as a stand-by for the other) which emits the red light specified by the ICAO standards for "low intensity" lights, using for this purpose a lenticular light globe with oriented Fresnel prisms.

The attached diagram (FIG. 4) guarantees the required coverage.

The lamps (of a special type) have been rated by taking into account the voltage drop introduced by the power cable (140 meter long approx in the worst case) and they present an antivibration bayonet cap.

The two following types of lamps are used: bifilar lamp 15+15 Watt/44 V dc bifilar lamp 15+15 Watt/20 V dc The mean life time for each lamp is 4000 hours approximately, however it is suggested to conservatively replace the lamp as soon as the first filament burns out.

FIG. 5 shows the lay-out of the sub-rack SUB with the system module accomodated thereon; the rectifier module MR (if any), marked by U3 is installed at the upper side, complete with the true rectifier RA and protection fuses F1 and F2 in the first respectively second 110 Volt primary. In most cases U3 is not equipped, however, in principle, some space is reserved in the sub-rack SUB to accomodate it. Under U3 (MR) the control module is accomodated; the control module MC includes PCS, U2, complete with LED test push-button, PL1, a main on/off switch 13 in the dc power supply line, and three lamps L1,L2, L3 used to display failures in the service lamp (OR) and the stand-by lamps (OR) with respect to one of the assembly switched-on. Then five equal pc boards U1 follow for each switch module from M1 to M5, each fitted with a fault signalling lamp for lamps LA1 through LA5 respectively.

Contrary to the previous implementations which use ac power supply for 2-lamp light points, the present invention, which has been specifically developed for low power consumption radio stations and to power the lamps from direct current sources, is characterized by the following innovations:

an extreme safety for the maintenance staff operating into the tower while replacing the lamps; thanks to the fact that the power supply voltage is 24/48 V;

control and switch-over circuits are electronic and not electromechanical any longer;

modular construction which permits in-field expansion from one to more positions, for instance from one to 5 light points;

use of 2-filament lamps, which reduces the cost for each light point by 50%;

mechanical integration with the equipment infrastructures in the radio station;

compliance with the ICAO specifications for low luminous intensity (10 candles) red light signallings;

protection circuits against induced voltage surges incorporated in the system;

possibility of using alternate current source by simply adding a rectifier module, already foreseen in the system.

The switch-over unit performs the following functions, in addition to the main function, consisting of controlling the presence of the main tower light and consequently switching over the stand-by tower light, if necessary:

to provide a local indication (LED) whenever the main filament burns out to provide an alarm for the control module, whenever the stand-by filament burns out (this alarm shall only to be considered valid if the main filament is correctly operating).

A strapping facility is included in the switch-over unit; it shall be turned off or on depending on whether the primary power is taken from a −48 V dc or respectively −24 V dc battery, in order to improve the overall efficiency.

We claim:

1. A system for controlling and supplying electrical power to obstruction lights, comprising:
   (a) a solar energy generator subsystem for generating low voltage DC electricity from sunlight and for detecting the intensity of said sunlight;
   (b) a control subsystem coupled between said solar energy generator subsystem and said obstruction lights, comprising:
     (i) a threshold detector and on/off switch for delivering said low voltage DC electricity to said obstruction lights when the intensity of the detected sunlight falls below a predetermined threshold; and
     (ii) circuitry for generating an indicator signal representing the status of said on/off switch and for generating lamp failure control signals for local signalling and telemetering purposes; and
   (c) a low luminous intensity, lower power consumption lighting sub-system comprising said obstruction lights, each of said obstruction lights comprising a two-filament incandescent lamp with a primary filament which is active under normal conditions and a reserve filament which is active when said primary filament burns out, both filaments being identical.

2. The system of claim 1, further comprising an electricity distribution system which receives DC electricity from said solar energy generator or from a battery charged with electricity from said solar energy generator, and supplies electricity to said control subsystem for powering said obstruction lights.

3. The system of claim 1, further comprising a solid state, DC powered, switchover module associated with each obstruction light for activating the reserve filament in the obstruction light when the primary filament burns out.

4. The system of claim 2, further comprising a rectifier module for converting externally supplied AC power into DC power for use in powering said obstruction light in lieu of said DC electricity from said solar energy generator or from said battery.

5. The system of claim 1, further comprising voltage spike protection circuitry between said control subsystem and said indicator lights.

6. The system of claim 1, wherein a lenticular light globe with oriented Fresnel prisms is used with said lamp filaments, such that the illumination from said lamps is emitted over 360 degrees.

* * * * *